F. BRELLE, Sr.
FRUIT JAR.
APPLICATION FILED AUG. 5, 1914.
1,142,231. Patented June 8, 1915.
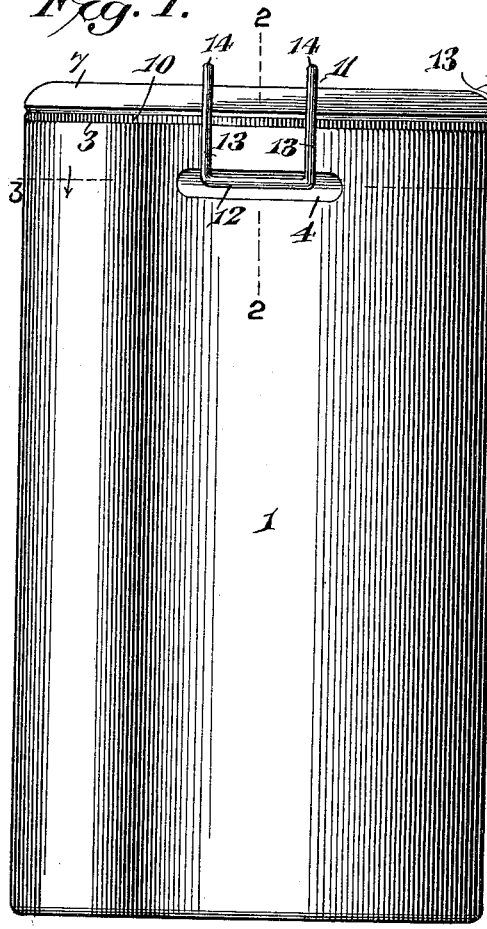
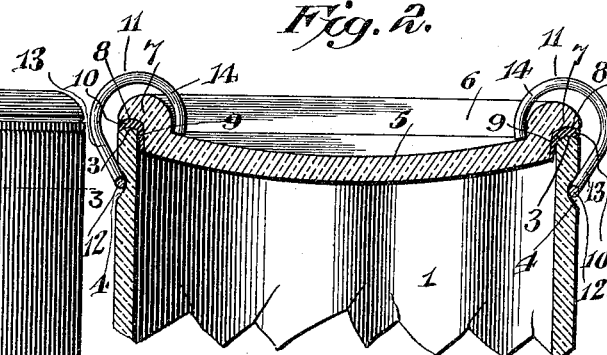
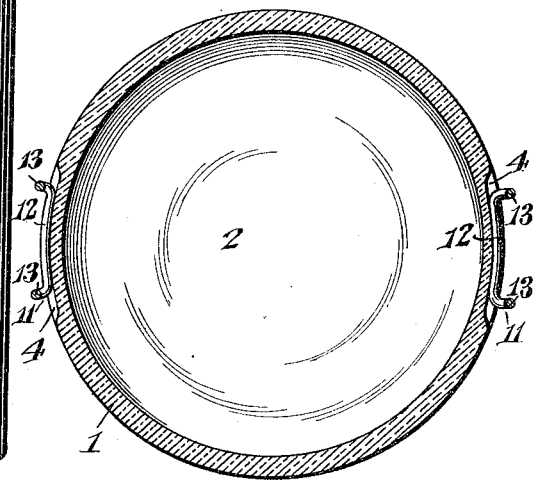
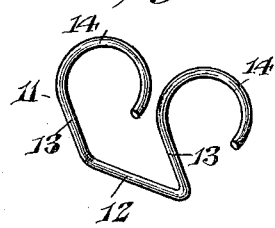
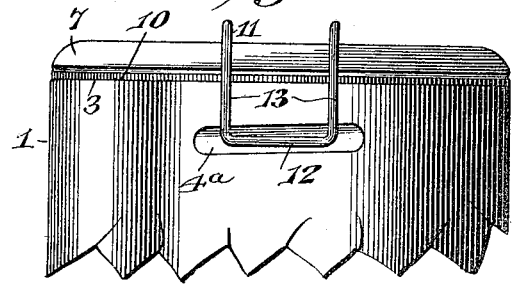
Frank Brelle, Sr., INVENTOR,
WITNESSES
BY
ATTORNEY

UNITED STATES PATENT OFFICE.

FRANK BRELLE, SR., OF SAN JOSE, CALIFORNIA.

FRUIT-JAR.

1,142,231.   Specification of Letters Patent.   Patented June 8, 1915.

Application filed August 5, 1914. Serial No. 855,245.

*To all whom it may concern:*

Be it known that I, FRANK BRELLE, Sr., a citizen of the United States, residing at San Jose, in the county of Santa Clara and State of California, have invented a new and useful Fruit-Jar, of which the following is a specification.

This invention has reference to fruit jars, and means for sealing and facilitating the sealing of the fruit jars.

The object of the present invention is to provide a fruit jar of the vacuum-seal type, whereby a jar cover is effectively sealed, and is also temporarily held in place by temporarily applied holding means, while the contents of the jar are heated to drive out all air in the jar, whereby upon cooling of the contents of the jar a vacuum is created therewithin, and the cover is held in place by atmospheric pressure. Moreover, the present invention admits of the utilization of a jar of smooth cylindrical exterior without protuberances of any kind, whereby the jars are readily packed without injury or liability of breakage.

In accordance with the present invention the jar is of the same diameter throughout and the cover member may be of the same diameter as the jar, and is so arranged that with a sealing ring gasket of suitable width the sealing gasket may be lodged between the free end of the mouth of the jar and the corresponding portion of the cover where matching the mouth of the jar. The cover is provided with a plug portion entering for an appropriate distance into the mouth of the jar, and so shaped and spaced with relation to the inner wall of the mouth of the jar as to cause a portion of the sealing gasket to lodge between the plug portion and the inner wall of the mouth of the jar, thus materially extending the sealing zone and correspondingly improving the seal and preventing possible leakage.

When the jar has received the material to be preserved the cover is applied and is held in place by temporary clip members provided by the present invention and so arranged as to yield to internal pressure permitting the escape of air and steam or vapor generated by the heating of the contents of the jar. On the cessation of the internal pressure, as when the contents of the jar begin to cool, the clips hold the cover tightly against the jar until atmospheric pressure begins to be exerted upon the cover due to the cooling of the contents to such an extent that subatmospheric pressure is produced within the jar. When the contents of the jar have become cold, the superiority of the atmospheric pressure over any pressure which may possibly exist within the jar is so great as to effect the complete and perfect sealing of the jar against any possibility of the entrance of air, so that the contents of the jar remain perfectly protected against the entrance of any deleterious material; the heating having primarily sterilized the contents of the jar. When the atmospheric sealing is established, the temporary holding clips are removed, so that the exterior of the jar is wholly free from protuberances, and the jar on the exterior is straight from end to end. Usually the jars are made cylindrical, but this does not preclude the formation of the jars of other cross-section so long as the jars are of substantially constant form throughout their length.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is an elevation of a jar constructed in accordance with the present invention, with the cover or cap member in place, and also showing the temporary holding clips in place. Fig. 2 is a section on the line 2—2 of Fig. 1. Fig. 3 is a section on the line 3—3 of Fig. 1. Fig. 4 is a perspective view of one of the temporary holding clips. Fig. 5 is a view of the top portion of the jar similar to Fig. 1 but showing a somewhat modified form thereof.

Referring to the drawings, there is shown a jar 1 usually, though not necessarily, made of glass, and usually, though not necessarily, circular in cross-section. For convenience of description it will be considered that the jar is circular in cross-section, but it may be oval or some other similar shape. The jar is of equal diameter throughout its length, and if circular in cross-section, is exteriorly a cylinder permanently closed at one end by a bottom 2, while at the other end the jar has a freely open mouth.

Since it is customary to mold the jars out of glass, the edge of the mouth end is usually slightly rounded, as indicated at 3, and on opposite sides of the outer face of the jar in suitably spaced relation to the mouth edge are laterally elongated notches 4 for a purpose to be described.

Adapted to the mouth end of the jar is a cap member 5 having a centrally depressed portion and a marginal rounded rib 6 having a radial outstanding flange 7, which may have a slightly concave face 8 conforming generally to the rounded edge 3 of the mouth of the jar. The outer diameter of the cap member including the flange 7 is substantially that of the jar, and considering the jar as cylindrical, the cap member is made circular.

The depressed portion of the cap member has an outer marginal portion 9 slightly tapering and forms a plug portion of the cap member designed to enter the mouth of the jar for a short distance with the tapering margin 9 quite close to the inner wall of the mouth of the jar. There is also provided a sealing gasket 10 usually of rubber and preferably, though not necessarily, concave on one face and convex on the other, and conforming in a general way to the shape of that portion of the cover or closure adapted to rest on the end of the mouth of the jar and project a short distance thereinto. The width of the sealing gasket is such that it extends from approximately the outer edge of the flange 7 to the inner edge of the taper wall 9 of the plug part of the cover, cap or closure. The sealing ring or gasket is made of such diameter as to snugly fit the sealing part of the cap where it rests on and enters the mouth of the jar, wherefore the sealing ring engages not only the upper edge of the mouth of the jar, considering the jar as upright, but also lodges between the inner wall of the mouth of the jar and the taper wall of the plug. When suitable pressure is applied to the cap or closure, the gasket squeezes tightly against the walls between which it is confined, and provides an extended seal from about the outer edge of the jar to the inner edge of the plug portion of the cap. There are also provided clips 11 each preferably formed of a single piece of wire having an intermediate yoke portion 12 with terminal legs 13 extending from the yoke portion at substantially right angles thereto and each ending in a rounded return portion 14 forming an open hook having a degree of elasticity and of a size to engage over the rounded rib 6 of the cap or cover in spaced relation thereto when the yoke portion 12 is seated in the groove 4. Such groove 4 may be in substantially parallel relation to the edge 3 of the jar mouth as in Fig. 1, or may be slightly inclined thereto, as shown at 4ᵃ in Fig. 5, so that in the latter case after the clip is engaged in the groove by its yoke portion with the hook ends 14 engaging over the rib or bead 6 on the outer face of the jar closure, a movement of the clip in the proper direction circumferential of the jar causes the clip to engage with greater force, and so hold the jar cover more firmly in place, but the size and elasticity of the hook ends 14 will at the same time permit slight movements of the cover away from the mouth of the jar.

The gasket 10 may be of even thickness throughout its width, or may taper toward the inner edge, which inner edge engages the taper portion 9 of the jar cap or closure. This means that there is a slight space between the inner edge of the gasket and the inner wall of the jar, hence heated air or steam within the jar in seeking to find escape will flow into such space and the pressure raising the jar cover slightly permits the air or steam under pressure to escape between the gasket and the upper edge of the jar. During such operation the gasket clings tightly to the jar cap or closure, and hence lifts with it. This prevents any liability of blowing out or displacing the ring during the heating operation, since there is no tendency of the hot gases finding their way between the sealing gasket and the jar cap.

In the practical operation of the invention, the material to be preserved is placed in the jar, the cap with the sealing gasket already applied is then placed upon the mouth end of the jar, and clips 11 are applied to the cap with the yoke portions snapped into the grooves 4 or 4ᵃ, as the case may be, thereby anchoring the cap to the jar. This anchoring, however, is not so firm but that the cap may yield slightly to superior internal pressure, and air trapped within the jar, and possibly in the contents of the jar, is expanded, while continued heat causes the formation of steam or vapor. This establishes a pressure within the jar acting on the cap to raise it, so that the air under pressure and finally the steam or vapor under pressure escapes from the jar, the hooks 14 yielding sufficiently for the purpose, and the gasket 10 moving out of the path of the escaping air and steam to an extent preventing it from being affected by such air or steam. When the contents of the jar have been sufficiently treated the jar is removed from the heating zone and allowed to cool. On the reduction of superatmospheric internal pressure and the equilibrium of pressure, the elastic tendency of the clips causes the cap to seat quite closely upon the mouth end of the jar, and as the contents of the jar further cool until subatmospheric pressure is established in the jar, the superior atmospheric pressure forces the cap more closely against the jar than before, thus squeezing the gasket 10 into firm air tight relation to the jar and causing the gasket to engage to an extent between the plug portion of the cap and the inner wall of the mouth end of the jar. When the contents of the jar have finally cooled to atmospheric temperature, the absence of air in the jar and the condensation of the vapor or steam caused by heating, result in the establishment of a condition closely approaching a vacuum, so that such condition is customarily called a vacuum, and the available atmospheric pressure may closely approach in effect full atmospheric pressure, or nearly fifteen pounds per square inch. The clips 11 being no longer needed, are removed, and may be used upon other jars being treated.

With a jar constructed in accordance with the present invention there are no surface protuberances at all, and consequently the jars may be packed together in close relation without being subjected to such strains as are liable to occur where slight ridges or other protuberances are present.

What is claimed is:—

1. A preserving jar comprising a body member of even diameter throughout with oppositely-disposed circumferentially extended grooves in its outer wall near the mouth end, a cap member having a plug portion adapted to enter the jar, and a peripheral bead of a diameter to override the mouth end of the jar, said cap being adapted to confine a sealing gasket to the mouth of the jar, and temporary clips each having a yoke portion and elastic hook portions adapted to engage in a respective one of the grooves of the body of the jar and over the bead portion of the jar cap when applied to the body of the jar for yieldingly holding the cap in place during treatment of the jar to cause vacuum conditions therein.

2. A preserving jar comprising a body portion having exterior grooves near the mouth end, a cap member provided with a peripheral bead adapted to override the mouth end of the jar and a plug portion adapted to enter the mouth of the jar, a gasket of a width to extend from the outer edge of the bead portion of the cap member to the inner end of the plug portion thereof, and temporary clips each having a portion adapted to enter a respective groove in the outer face of the jar and provided with members adapted to engage the cap member behind and of a size to then be in spaced relation to the bead portion thereof and having a degree of elasticity to yield to pressure exerted on the cap member within the jar and tending to lift the cap from the jar.

3. A preserving jar comprising a body portion having circumferentially extended exterior grooves near the mouth end, a cap member provided with a peripheral bead adapted to override the mouth end of the jar and a plug portion adapted to enter the mouth of the jar, a gasket of a width to extend from the outer edge of the bead portion of the cap member to the inner edge of the plug portion thereof, and temporary clips each comprising a yoke portion and legs extending therefrom in substantially parallel relation one to the other and terminating in hook extremities of a size to extend about and in spaced relation to the bead of the cap and engage the upper surface of the cap back of the bead, each clip having a degree of elasticity to yield to pressure exerted from within the jar upon the cap and tending to lift it from the jar.

4. A preserving jar comprising a body portion and a cap member adapted to the body portion to confine a sealing gasket between the cap member and the mouth of the jar, and temporary clips for holding the cap portion to the jar preparatory to sealing the jar, each clip comprising a single piece of wire bent into an intermediate yoke with terminal legs extending therefrom at substantially right angles thereto and each ending in a rounded return portion forming an open hook of a size and having a degree of elasticity to engage the cap member by the end of the hook and be otherwise in spaced relation to said cap member when the yoke portion is in engagement with the jar and yield to pressure within the jar tending to force the cap member away from the jar.

In testimony, that I claim the foregoing as my own, I have hereto affixed my signature in the presence of two witnesses.

FRANK BRELLE, Sr.

Witnesses:
S. G. TOMPKINS,
BROOKS TOMPKINS.

Copies of this patent may be obtained for five cents each, by addressing the "Commissioner of Patents, Washington, D. C."